United States Patent
Miller et al.

(10) Patent No.: US 10,632,508 B1
(45) Date of Patent: Apr. 28, 2020

(54) METHOD FOR CLEANING AND PREVENTING PLUGGING IN MICRO-IRRIGATION SYSTEMS

(71) Applicants: John C. Miller, Fresno, CA (US); Deborah L. Miller, Fresno, CA (US)

(72) Inventors: John C. Miller, Fresno, CA (US); Deborah L. Miller, Fresno, CA (US)

( * ) Notice: Subject to any disclaimer, the term of this patent is extended or adjusted under 35 U.S.C. 154(b) by 0 days.

(21) Appl. No.: 16/667,391

(22) Filed: Oct. 29, 2019

Related U.S. Application Data

(60) Division of application No. 16/029,501, filed on Jul. 6, 2018, now Pat. No. 10,493,499, which is a continuation of application No. 14/311,718, filed on Jun. 23, 2014, now Pat. No. 10,046,369, which is a continuation-in-part of application No. 12/313,174, filed on Nov. 18, 2008, now Pat. No. 8,821,646, which is a continuation-in-part of application No. 11/342,905, filed on Jan. 30, 2006, now abandoned.

(51) Int. Cl.
| | |
|---|---|
| *C02F 5/14* | (2006.01) |
| *C02F 5/12* | (2006.01) |
| *C08F 120/06* | (2006.01) |
| *B08B 3/08* | (2006.01) |
| *C11D 7/50* | (2006.01) |
| *A01G 29/00* | (2006.01) |

(52) U.S. Cl.
CPC ............... *B08B 3/08* (2013.01); *A01G 29/00* (2013.01); *C11D 7/5009* (2013.01)

(58) Field of Classification Search
None
See application file for complete search history.

(56) References Cited

U.S. PATENT DOCUMENTS

| | | | |
|---|---|---|---|
| 3,721,269 | A | 3/1973 | Choate et al. |
| 6,312,493 | B1 | 11/2001 | Eltink et al. |
| 6,706,666 | B2 | 3/2004 | Hasebe et al. |
| 8,821,646 | B1 | 9/2014 | Miller et al. |
| 10,046,369 | B1 | 8/2018 | Miller et al. |
| 2001/0029240 | A1 | 10/2001 | Hasebe et al. |
| 2004/0033923 | A1 | 2/2004 | McClung |
| 2004/0250582 | A1 | 12/2004 | Ambri |
| 2007/0065542 | A1 | 3/2007 | Pak |

FOREIGN PATENT DOCUMENTS

| | | |
|---|---|---|
| CA | 2005970 A1 | 6/1990 |
| JP | 2004217919 A | 8/2004 |

OTHER PUBLICATIONS

Kunio Yamaguchi; "Cleaning Agent for Irrigation Tube and Method for Cleaning the Irrigation Tube by Using the Same"; Bibliographic Data of JP2004217919 (A); Aug. 5, 2004; http://worldwide.espacenet.com.
Arthur Harris; "Method of Treating Water Containing Fertilisers"; Bibliographic Data of CA2005970 (A1); Jun. 21, 1990; http://worldwide.espacenet.com.
Jerry March; "Advanced Organic Chemistry"; 1985; pp. 1057-1060; John Wiley & Sons, Inc.; USA.
Robert G. Evans; "Microirrigation"; USDA-ARS-NPARL; 10 pages; Sidney, MT.
"N-pHURIC Low Volume Irrigation Systems"; 2 page brochure; IND/AG; Fresno, CA.
"N-pHURIC GTO Water Treatment Additive"; 1 page flyer; Monterey AgResources; Fresno, CA.
"N-pHURIC 10/55 Fertilizer"; 1 page fact sheet; Agrium; Calgary, Alberta, CA.
"Calcium sulfate"; Jul. 3, 2017; 4 pgs.; downloaded from https://en.wikipedia.org/wiki.
"Cell wall"; Jul. 6, 2017; 10 pgs.; downloaded from https://en.wikipedia.org/wiki.
"Citric acid"; Jul. 3, 2017; 9 pgs.; downloaded from https://en.wikipedia.org/wiki.
"Elbs persulfate oxidation"; Jul. 5, 2017; 2 pgs.; downloaded from https://en.wikipedia.org/wiki.
"Formic acid"; Jul. 6, 2017; 9 pgs.; downloaded from https://en.wikipedia.org/wiki.
"Peptidoglycan"; Jul. 6, 2017; 5 pgs.; downloaded from https://en.wikipedia.org/wiki.
"Peroxydisulfate"; Jul. 3, 2017; 1 pg.; downloaded from https://en.wikipedia.org/wiki.
"Potassium peroxymonosulfate"; Jul. 3, 2017; 3 pgs.; downloaded from https://en.wikipedia.org/wiki.
"Carbonate chemistry"; Oct. 10, 2012; 6 pgs.; downloaded from https://www.sciencelearn.org.nz/resources/469-carbonate-chemistry.
"Calcium carbonate"; Apr. 29, 2019; 12 pgs.; downloaded from https://en.wikipedia.org/wiki.
"PH of Organic Acids and Salts"; Jun. 13, 2019; 3 pgs.; downloaded from www.aqion.de/site/192.
"Calcium polyphosphate," 2 pgs.; prepared at the 26th JECFA (1982), published in FNP 25 (1982) and in FNP 52 (2000).
"How does calcium carbonate and acid react?"; Apr. 29, 2019; 3 pgs.;downloaded from https://www.quora.com/How-does-calcium-carbonate-and-acid-react.

*Primary Examiner* — Yun Qian
(74) *Attorney, Agent, or Firm* — Andrew D. Fortney; Central California IP Group, P.C.

(57) ABSTRACT

A micro-irrigation system cleaning method adds a formulation which contains a water-soluble organic acid which has a pK(1)a of less than about 4.0, and optionally a water-soluble phosphonate dispersant. The cleaning continues for a time period of from three to twenty-four hours in a static environment.

17 Claims, No Drawings

METHOD FOR CLEANING AND PREVENTING PLUGGING IN MICRO-IRRIGATION SYSTEMS

CROSS REFERENCE TO RELATED APPLICATIONS

This application is a divisional of U.S. patent application Ser. No. 16/029,501, filed Jul. 6, 2018, pending, which is a continuation of U.S. patent application Ser. No. 14/311,718, filed Jun. 23, 2014, now U.S. Pat. No. 10,046,369, which is a continuation-in-part of U.S. patent application Ser. No. 12/313,174, filed Nov. 18, 2008, now U.S. Pat. No. 8,821,646, inventors Miller et al., for Compositions and Methods for Preventing Plugging in Micro-Irrigation Systems, which is a continuation-in-part of U.S. patent application Ser. No. 11/342,905, filed Jan. 30, 2006, inventors Miller et al., for Compositions and Methods for Preventing Plugging in Micro-Irrigation Systems, each of which is incorporated herein by reference as if fully set forth herein.

BACKGROUND OF THE INVENTION

The present invention relates to methods and compositions for cleaning micro-irrigation systems.

The agriculture industry has developed the practice of adding plant nutrients and soil amendments to the plant environs, such as the soil, to enhance crop growth and subsequent yields. These fertilizers and amendments come in a variety of formulations depending on the specific crop to be grown and its nutrient requirements.

Fertilization methods ultimately were facilitated by the practice of adding inorganic fertilizers and soil amendments to the water being used to irrigate the crops. The term "fertigation" is sometimes used for this combination of irrigation and fertilization. Although the early techniques were extremely crude by today's standards, the techniques nonetheless obtained better yields and drastically minimized the labor of applying these fertilizers.

Today's high demand for crops (food crops and otherwise) has turned agriculture into a technically-sophisticated business, and a business in which large corporate farms dominate the small family farm. The technical challenges faced by the modern agricultural industry include both the ever-increasing need for arable land, especially in the western and southwestern United States, and the decreasing availability and increasing cost of water. To meet the need for water conservation, today's technology includes micro-irrigation systems that deliver very precise amounts of water directly to the plant that is being grown. In the past 20 to 30 years, a large percentage of crop producers in the western and southwestern United States have converted to micro-irrigation systems utilizing this micro-irrigation technology.

Similar to the advent of "fertigation" practices generally, upon conversion to micro-irrigation systems, modern farmers began adding fertilizers and soil amendments to them. In micro-irrigation systems, unfortunately, water quality and the inclusion of fertilizers and other additives cause severe problems. The problems arise from a number of factors: (1) the micro-irrigation water is typically obtained from wells, reservoir, lakes, or rivers which contain various amounts of dissolved minerals; and (2) fertilizers, soil amendments and other additives can form insoluble salts and/or cause particulate formation when added to the water. Macro-irrigation systems mainly tolerate these conditions, while micro-irrigation systems are extremely intolerant.

The sensitivity of micro-irrigation systems to water quality and additives stems from the refinement of the components in a micro-irrigation system. In order to add precise amounts of water directly to the plant or crop being irrigated, micro-irrigation systems, including subsurface systems, contain devices called emitters, micro-sprinklers or other such devices. These devices deliver the desired precise amounts of water so long as they do not plug or foul. Plugging occurs when deposits, from any source, build up inside these devices. The smallest particle or foreign material can cause fouling of these devices, because these devices have very tiny orifices and/or a long tortuous narrow passageway that provide the requisite pressure for delivery of precise amounts of water in a uniform manner to each plant in the crop being irrigated.

The addition of fertilizers or other materials, for instance soil amendments, to the micro-irrigation water increases the loading of inorganic salts over that already in the water. When the loading, or the combined loading, is too high, the solubilities of at least some of the naturally-occurring minerals and/or added compounds are exceeded and particulate formation increases dramatically. When particulates form, significant deposits begin to build up throughout the entire micro-irrigation system. The end result is plugging of the emitters or micro-sprinklers. Plugging results in uneven distribution of water and nutrients to the crop being irrigated. In some cases, complete shut-down of the micro-irrigation system occurs. Therefore problem-free use of additives such as fertilizers and/or soil amendments and the like in micro-irrigation systems is conventionally limited to the systems that use relatively pure water sources. When the water source is not relatively pure, the fertilizer or soil amendment is often distributed to the crop by means other than through the micro-irrigation system, with the loss of "fertigation" benefits.

SUMMARY OF THE INVENTION

The present invention provides a method of cleaning a micro-irrigation system using a system cleaning formulation comprising an aqueous cleaning-formulation solution containing a water-soluble organic acid, wherein the water-soluble organic acid has a pK(1)a of less than about 4.0, and in some embodiments, a water-soluble organic acid and a water-soluble phosphonate dispersant (a water-soluble orthophosphonate dispersant).

DETAILED DESCRIPTION OF THE INVENTION

Most naturally-occurring waters contain dissolved minerals that by themselves can cause plugging in micro-irrigation systems. Water bicarbonate alkalinity concentrations exceeding about 2 meq/liter (200 ppm as $CaCO_3$) can cause calcium carbonate precipitation. Calcium concentrations exceeding 2-3 meq/liter (100-150 ppm as $CaCO_3$) can cause precipitates to form during the injection of phosphate fertilizers. The solubility chart below provides an overview of inorganic anion/cation incompatibilities, that is, anions and cations that, when both are present, lead to insoluble inorganic salt formation that can cause plugging in micro-irrigation systems.

CHART 1

Solubility Chart For
Common Irrigation-Systems Anions And Cations

| Cation | Anion | | | | | | | |
|---|---|---|---|---|---|---|---|---|
| | $Cl^-$ | $HCO_3^-$ | $OH^-$ | $NO_3^-$ | $CO_3^{-2}$ | $SO_4^{-2}$ | $S^{-2}$ | $PO_4^{-3}$ |
| $Na^+$ | S | S | S | S | S | S | S | S |
| $K^+$ | S | S | S | S | S | S | S | S |
| $NH_4^+$ | S | S | S | S | S | S | S | S |
| $H^+$ | S | S | $H_2O$ | S | $CO_2$ | S | $H_2S$ | S |
| $Ca^{+2}$ | S | SS | VSS | S | I | VSS | XXX | I |
| $Mg^{+2}$ | S | S | I | S | VSS | S | XXX | I |
| $Fe^{+2}$ | S | SS | VSS | S | VSS | S | I | I |
| $Fe^{+3}$ | S | I | I | S | I | S | XXX | I |
| $Mn^{+2}$ | S | XXX | I | S | I | S | I | I |

In Chart 1, S means soluble (over 5,000 ppm), SS means slightly soluble (2,000 to 5,000 ppm), VSS means very slightly soluble (20-2,000 ppm), I means insoluble (<20 ppm) and XXX means does not form (is not a compound). From Kemmer, Frank N., *Water: The Universal Solvent*, Basic Chemistry, p. 37, Nalco Chemical Company (1977).

As seen from the solubility information in Chart 1, the addition of phosphates, such as phosphate fertilizers, to naturally-occurring waters that contain hardness (calcium or magnesium) can cause precipitation that would result in plugging of micro-irrigation system Irrigation-System Cleaning Composition and Method The typically most prevalent conditions that diminish the suitability of the water quality for micro-irrigation are: (1) inorganic loading of the source water, (2) organic loading of the source water; (3) addition of fertilizers and/or soil amendments to the source water; and (4) efficiency of the filtration system.

Inorganic Loading of the Source Water

Although irrigation water sources vary dramatically, they frequently contain a considerable amount of inorganic salts, dissolved hydrogen sulfide and carbon dioxide. The presence of such constituents can lead to several fouling problems. High levels of calcium, magnesium and carbon dioxide, at a basic pH (7 to 8 and higher), form significant amounts of insoluble (or only slightly soluble) calcium and magnesium carbonates. Under such pH conditions, iron and manganese, even at low levels, form significant levels of insoluble or only slightly soluble iron and manganese oxides. The propensity of these salts to precipitate out of solution is exacerbated in a micro-irrigation system because much of the irrigation tubing is typically above ground and black in color. The irrigation tubing and emitters or micro-sprinklers usually have a black coloration which has been added as a UV inhibitor to prevent deterioration of the plastic due to sunlight. The black coloration unfortunately exacerbates plugging or fouling problems because it absorbs light and the light that is absorbed is converted to heat. The heat raises the water temperature which escalates precipitation of calcium and magnesium carbonates (similar to the scale that builds up on a tea kettle). This increase in temperature of the irrigation components and subsequent precipitation of carbonate salts becomes even more dramatic when the micro-irrigation system is shut down and under "no flow" conditions. The significantly higher temperature inside the black irrigation components under a no-flow condition evaporates irrigation water, which increases the concentration of the constituents, causing a higher degree of precipitation and even more plugging potential.

Biological Loading of the Source Water

Biological loading in the source water results from two major factors, namely algae and/or bacteria. Both algae and bacteria typically are present if surface water, such as a reservoir, canal, river or pond, is used as the source of the irrigation water. Bacteria and bacterial slimes typically also are present if the source of the irrigation water is subsurface, such as a well. Regardless of the source of the water, these biological materials proliferate inside the micro-irrigation system and bind to the surfaces of the micro-irrigation system and to the scale deposits in the system, ultimately fouling the micro-irrigation system.

Addition of Fertilizers and/or Soil Amendments to the Source Water

Fertilizers are generally defined as materials that add nutrient value to the soil that enables enhanced growth and development of the plant or crop. Soil amendments are generally defined as materials that enable the nutrients, already in the soil, to be more efficiently utilized and transported to the plant or crop being grown. Regardless of whether the material is a fertilizer or soil amendment, these additives, when added to a micro-irrigation system for distribution, can cause significant fouling of the micro-irrigation system and its components.

These problematic fertilizer and/or soil amendment additives include inorganic materials such as: (1) the various NPK (nitrogen, phosphorus, and potassium) fertilizer formulations; (2) the diverse micronutrient formulations that can contain iron, zinc, or manganese, as well as other heavy metals; and (3) the common inorganic soil amendments such as gypsum (calcium sulfate pentahydrate) and lime (calcium carbonate). All of these additives can elevate the risk of fouling of the micro-irrigation system due to precipitation of inorganic salts. Chart 1 above provides solubility data for common cation/anion combinations to demonstrate the precipitation and deposit formation potential thereof. In other words, Chart 1 shows the anions and cations that, when both are present, lead to insoluble inorganic salt formation that can cause plugging in micro-irrigation systems.

Organic additives used as fertilizers and/or soil amendments, such as compost teas (liquid compost), fish emulsions and the like, are typically made via a biological fermentation process. The bacteria that already proliferate in these additives exacerbate biological plugging of the micro-irrigation system.

Efficiency of the Filtration System

Whether the water source is surface or subsurface, freshly-pumped irrigation water can contain large particulate material which can be removed with a filtration system, such as a screen, disk, and/or sand media bed. Nevertheless, a considerable amount of fine particulate matter passes through the filtration system and binds with both organic material and precipitating inorganic salts, forming larger particles that further cause fouling of the micro-irrigation system. Another, and worse, filtration-system related problem is the ill-considered practice of adding fertilizers and/or soil amendments downstream of the filtration system. This "downstream addition" practice eliminates additive-derived precipitates from plugging the filters, but frequently leads to severe deposits within the micro-irrigation system, which is a condition the filtration system is intended to prevent. Further, the severity of emitter plugging due to "downstream addition" can even shut down a micro-irrigation system and bring about a need for immediate remediation to avoid crop loss due to the lack of irrigation water.

Currently, the two most common methods for cleaning a micro-irrigation system are treatment with sulfuric acid or an adduct of sulfuric acid and urea (monocarbamide dihydrogen sulfate or MCDS) which is commercially available under the brand name of N-pHURIC® from Agrium of Calgary, Alberta, Canada. These two common irrigation system treatments are not, however, entirely satisfactory as demonstrated in the examples below. In addition, both products are extremely dangerous to handle and use because both are extremely corrosive. If not handled and used properly, these products can be hazardous for the user and harmful to the micro-irrigation system.

The present cleaning composition and method provide a reliable, safe, economical, much less corrosive approach to cleaning a micro-irrigation system that has been compromised due fouling or plugging arising from one or more sources such as those described above. The micro-irrigation system is cleaned by addition of a unique combination of a strong organic acid and an ortho-phosphonate dispersant to the irrigation water, or the organic acid or blend (combination) of organic acids without the dispersant. Cleaning of the micro-irrigation system is accomplished with a deposit-removing amount of certain water-soluble organic acids, such as and preferably formic acid (which is used exemplary in most of the discussions below), usually and preferably in combination with a small amount of a dispersant, present in the water of a micro-irrigation system for a period of time sufficient to remove, suspend and/or solubilize such deposits. The dispersant must be sufficiently water soluble and the more preferred phosphonate dispersants are 1-hydroxyethylidene-1,1-diphosphonic acid (HEDPA) and amino tris (methylenephosphonic acid) (ATMP) and their sodium, potassium and ammonium salts.

Dispersants of this type act upon deposits of inorganic scale and biological materials to maintain them in a fine state of subdivision (microscopic), and the surface of these microscopic particles are electrostatically charged, whereby they are prevented from agglomeration and from redeposition onto the surfaces of the micro-irrigation system. In addition, these dispersants are effective in the present method at very low ppm dosages and afford substantial corrosion protection to ferrous and non-ferrous metals components of a micro-irrigation system.

The formic acid, which may be used alone in the practice of the invention, is commercially available. It is typically available in concentrations ranging from 75 to 95 percent as formic acid in water. The phosphonate dispersants are also commercially available, typically as aqueous solutions ranging from 20 to 40 percent on an actives basis. The composition of formic acid and optional dispersant are fed into the micro-irrigation system in a shock treatment mode.

For a typical shock treatment, the formulation is fed into the micro-irrigation system at a rate (or level) of from about 1 to about 10 kg, and preferably from about 3 to about 5 kg, actives per acre being currently or actively served by the micro-irrigation system. For an approximately 40 weight percent actives formulation, the preferred rate or level of feed is about 2 to 3 gallons per acre being currently or actively served by the system. The acres being currently or actively served by the system at any given time is typically not the entire field served by a micro-irrigation system, but instead a block of the field or system that encompasses the acreage normally under irrigation simultaneously. This "per acre" basis for determining feed rate presumes a reasonably constant or consistent irrigation-system water capacity per acre being served.

The optimum or near optimum feed rate, whereby an efficient and successful, but not impractically excessive, concentration of the actives is fed to the irrigation water, depends on the water quality and the extent to which the micro-irrigation system is compromised.

To accomplish a shock treatment, the present cleaning formulation (for example, at a concentration of about 40 weight percent actives) is typically introduced into the micro-irrigation system at the manifold just before the micro-irrigation system enters the field. A typical drip-type or micro-irrigation pumping system pumps water at a rate of approximately 1000 gallons per minute, at a pressure of about 40 to 80 psi. The present cleaning formulation is typically introduced into the water of the micro-irrigation system, for instance and preferably via a positive displacement pump, at a rate of about 1.0 to about 1.5 gallons per minute. Such a feed rate is about 0.1 to about 0.15 percent of the rate at which the irrigation water is being pumped. A typical block to be irrigated is about 20 acres. At the 1.0 to 1.5 gallon per minute feed rate of the formulation, the introduction of the formulation requires about 40 to 60 minutes. To insure the product is reaching the most distant ends of the irrigation block, the irrigation-water pH is tested at the end of the farthest point in the block. Untreated irrigation water typically has a pH of 7.5 or greater. Upon introduction of the product to the irrigation water at the typical levels and rates indicated here, the irrigation-water is acidified and its pH drops. Upon addition of sufficient formulation (both as to covering the block being serviced and as to sufficient concentration for the particular irrigation water), the irrigation-water pH seen at the farthest point of the active section of micro-irrigation system typically is about 2.5 to about 3.0. Upon detection of sufficient coverage, by this or another method, the irrigation-water feed is shut off, stopping its flow. The micro-irrigation system, or that part of the system under treatment, is then allowed to stand for a sufficient time period, which typically is within the range of about 3 to about 24 hours, after which the micro-irrigation system is flushed with water. This type of shock treatment is typically done once or twice a growing season, but micro-irrigation systems with severe plugging problems require a more frequent treatment regime.

As mentioned above, the water quality of the irrigation water varies dramatically and the amount of the present cleaner formulation required for cleaning a micro-irrigation system is preferably determined prior to implementing the cleaning program. To establish the correct formulation level, a "demand curve" (or "titration curve") is preferably generated for the source water used for irrigation. A demand curve is produced by determining the amount of the additive, such as the present formulation, required to change the source irrigation-water pH from its normal state to a different, defined pH. Preferably the additive is added incrementally, such as by titration of a dilute water solution thereof, to a known weight or volume sample of the irrigation water source while the pH of irrigation-water sample is monitored. This step of the present method is illustrated in Cleaner Example 2 below.

Cleaner Comparative Example 1 and Example 2, Demand Curves

Demand curves were separately prepared for the commercial N-pHURIC® brand irrigation-system cleaner and for a formulation of the present invention containing about 40 weight percent actives, which actives were primarily formic acid plus a small amount of ATMP, using approximately equal samples of irrigation water from a grower's 20.5-acre irrigation block which was experiencing fouling problems. In Cleaner Comparative Example 1, an irrigation water sample of 112.8 grams was titrated with a 0.0823 volume percent aqueous solution of the N-pHURIC® brand irrigation-system cleaner. In Cleaner Example 2, an irrigation-water sample of 121.1 grams was titrated with a 0.150 volume percent aqueous solution of the formulation of the present invention. These stated concentrations of the titrants are based on "as is" products, and are not on an actives basis. The changes of the pH of the irrigation water samples with increasing loading of the titrated products were recorded at intervals starting with the irrigation water samples' initial 7.8 pH down to a pH of 2.0 for both examples. In each instance, the amount of titrant required to lower the irrigation water pH to a defined value, which here was a pH of 3.0, was determined from the tabulated data. (Plots of the titrant versus pH prepared from the tabulated data would of course provide the same information, but were not needed in either instance.) The "pH 3.0" product demands, that is, the volumes of the as-is or neat products required to lower the pH of 1,000 gallons of irrigation water to a pH of 3.0, were calculated, each as shown below in the respective Table 1 and Table 2 tabulated data.

TABLE 1

Cleaner Comparative Example 1
N-pHURIC ® Demand Curve

| Product Weight Added (grams) | Post-Addition Sample pH |
|---|---|
| 0.00 | 7.8 |
| 0.31 | 7.7 |
| 0.61 | 7.4 |
| 0.99 | 7.2 |
| 1.24 | 6.5 |
| 1.49 | 5.8 |
| 1.63 | 5.0 |
| 1.85 | 4.0 |
| 2.21 | 3.5 |
| 2.37 | 3.0 |
| 2.58 | 2.5 |
| 2.65 | 2.0 |

The N-pHURIC® demand was calculated as follows. The amount of the product titrant at 0.0823 vol. percent required to lower the pH of 112.8 grams of irrigation water to a pH of 3.0 was 2.37 grams. The calculation of the demand in terms of volume percent (converted from weights on a specific gravity of 1.0 for water or typical water solutions) is set forth below in Equation ("Eq.") (1) and is followed by its conversion to gallons of product per 1,000 gallons of irrigation water.

$$[(2.37 \text{ grams}) \times (0.0823\%)]/(112.8 \text{ grams}) = 0.173\% \text{ by volume} \quad (1)$$

From Eq. (1), it is determined that the "pH 3.0" demand for the N-pHURIC® cleaner is 1.73 gallons/1,000 gallons of irrigation water.

TABLE 2

Cleaner Example 2
Formulation Demand Curve

| Product Weight Added (grams) | Pest-Addition Sample pH |
|---|---|
| 0.00 | 7.8 |
| 0.25 | 7.7 |
| 0.84 | 7.2 |
| 1.01 | 6.9 |
| 1.27 | 6.5 |
| 1.48 | 6.0 |
| 1.60 | 5.7 |

TABLE 2-continued

Cleaner Example 2
Formulation Demand Curve

| Product Weight Added (grams) | Pest-Addition Sample pH |
|---|---|
| 1.71 | 5.2 |
| 1.81 | 4.7 |
| 2.02 | 4.0 |
| 2.26 | 3.4 |
| 2.51 | 3.0 |
| 2.82 | 2.5 |
| 3.40 | 2.0 |

The present formulation demand was calculated as follows. The amount of the product titrant at 0.150 vol. percent required to lower the pH of 121.1 grams of irrigation water to a pH of 3.0 was 2.51 grams. The calculation of the demand in terms of volume percent (converted from weights on a specific gravity of 1.0 for water or typical water solutions) is set forth below in Eq. (2) and is followed by its conversion to gallons of product per 1,000 gallons of irrigation water.

$$[(2.51 \text{ grams}) \times (0.150\%)]/(121.1 \text{ grams}) = 0.311\% \text{ by volume} \quad (2)$$

From Eq. 2 it is determined that the "pH 3.0" demand for the present formulation (at about 40 wt. percent actives) is 3.11 gallons/1,000 gallons of irrigation water. The data of Tables 1 and 2 can likewise be used to calculate the demand of either additive for other defined pHs, such as for a pH of 6.5.

As seen from Cleaner Comparative Example 1 and Example 2, and from Tables 1 and 2, more product is required per 1000 gallons of irrigation water for the present formulation than is required for the commercial N-pHURIC® formulation. The reason for this difference is that the as-is N-pHURIC® material is at a higher concentration and has a much greater density than the formic acid formulation. The N-pHURIC® used in this evaluation is composed, on a weight basis, of 32.14% urea, and 49.00% sulfuric acid in water. In contrast, the present formulation is 40.0% formic and 1.0% phosphonate (ATMP) in water. The same amount of acidity, of course, is required to neutralize the alkalinity of the irrigation water. The dramatic benefit of the present formulation over a commercial product such as N-pHURIC® is seen when their modes of action are considered. When a micro-irrigation system is treated with N-pHURIC®, it must be treated continuously, with the irrigation water flowing and the N-pHURIC® additive being fed, for an extended period of time (typically namely 4 to 6 hours) to dissolve any of the deposit fouling the system. The reason for this extended active-treatment time period is that N-pHURIC® acts on calcium carbonate according to the reaction shown in Eq. 3:

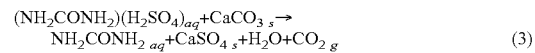
$$(NH_2CONH_2)(H_2SO_4)_{aq} + CaCO_{3\,s} \rightarrow NH_2CONH_{2\,aq} + CaSO_{4\,s} + H_2O + CO_{2\,g} \quad (3)$$

The reaction of Eq. 3 above reveals that the acidity of the N-pHURIC® dissolves the insoluble calcium carbonate and forms a slightly more soluble, but still substantially insoluble, calcium sulfate as well as free urea, water and carbon dioxide gas. This reaction, however, does not proceed beyond a negligible degree under substantially static conditions. Instead, under substantially static conditions, as calcium carbonate deposit begins to dissolve, the very slightly soluble calcium sulfate derived therefrom deposits onto the surface of the calcium carbonate deposit, forming a film which passivates the surface of the deposit, and thereby inhibits further calcium carbonate dissolution. The passivation of the calcium carbonate deposits with calcium sulfate, and resultant inhibition of calcium carbonate dissolution, is hampered, but possibly not completely stopped, under dynamic conditions whereby the localization of calcium sulfate upon formation is reduced. Therefore, a considerable turbulence, such as that created by flowing irrigation water, will to some degree boost the deposit dissolution activity of sulfuric acid/urea adduct irrigation-system cleaners such as N-pHURIC®, although they remain very poor cleaners for removing deposits from the micro-irrigation system, even under prolonged periods of flowing water.

In contrast, the formic acid in the present formulation dissolves the calcium carbonate in the micro-irrigation system, reacting with it to form the very soluble calcium formate plus carbon dioxide and water. In addition, the phosphonate will keep any other solids dispersed. The overall formic acid reaction with calcium carbonate is shown in Eq. 4 below.

$$2HCOOH_{aq} + CaCO_{3\,s} \rightarrow Ca^{+2}_{aq} + 2(HCOO)^-_{aq} + H_2O + CO_{2\,g} \quad (4)$$

As is seen from Eq. 4, the mode of action for the present formulation is totally different than that of the sulfuric acid/urea adduct irrigation-system cleaners. Since calcium formate is very soluble, the calcium carbonate on the surface of the micro-irrigation system begins to dissolve and continues to dissolve until all the calcium carbonate is removed or the formic acid is totally consumed. Given the extreme solubility of calcium formate and the large excess of formic acid present when the formulation is charged into the irrigation water in a sufficient amount to decrease the water pH to 3.0, a dynamic condition created by large amounts of flowing water is not required to facilitate the continuation of the cleaning dissolution to completion. This permits the present formulation to merely be introduced into the micro-irrigation system, without subsequent replenishment. Instead, after charging the formulation, the micro-irrigation system is simply shut off for a hold period during which the present formulation is left to totally dissolve and disperse any deposits. Such a hold period usually lasts from about 3 to about 24 hours. At the end of the hold period, the irrigation water is turned back on and the micro-irrigation system is flushed out with regular irrigation water.

The manner in which a shock treatment cleaning is conducted has a significant impact on the duration of the cleaner-feed interval, and of course the amount of cleaning agent used. In the method of the present invention, using the cleaning composition of the present invention, the cleaner-feed interval only continues until a sufficiently low pH, such as a pH of about 3.0, is realized substantially throughout the system, or part of the system, being cleaned. Typically, a pH of about 3.0 is seen at the end of the micro-irrigation system after about 40 to about 60 minutes after the feeding of the present formulation begins. As indicated above, upon reaching the desired pH, the feeding of the present formulation is discontinued and the water flow is shut off. In comparison, a sulfuric acid/urea adduct type of cleaner, such as N-pHURIC®, must be continuously fed to a micro-irrigation system throughout the entire cleaning interval. The manufacturer's recommendation for a clean-out or shock treatment using N-pHURIC GTO, which has a sulfuric acid equivalence of 49% and 15% urea (as N), is to (1) feed sufficient product into a micro-irrigation system to lower the pH to 2.5 or 3.0, (2) then operate at this pH level for three to six hours (after the initial feed interval), and (3) then stop the injection of the product and flush the system with just water. The present formulation's much shorter feed time of about 40 to 60 minutes, compared about 4 to 6 hours or more for a sulfuric acid/urea adduct product of comparable actives, translates to approximately a four to six times lower consumption of cleaning product, and that astounding achievement is accompanied by its far superior cleaning activity.

Cleaner Comparative Example 3 and Example 4, Usage Requirements

The usage requirements for the commercial sulfuric acid/urea adduct type of cleaner sold under the N-pHURIC® brand name and for the formulation of the present invention, both of which are described above with reference to the determination of their respective demand curves, were determined as follows. The N-pHURIC® was determined to have a "pH of 3.0" demand of 1.73 gallons of product per 1,000 gallons in the irrigation water which was tested. The present formulation was determined to have a higher "pH of 3.0" demand of 3.11 gallons of product per 1,000 gallons in the irrigation water which was tested. Presuming an upper-end shock-treatment feed period for each, namely 6 hours for the N-pHURIC® product and 1 hour for the present formulation, the amount of N-pHURIC® used for a single shock treatment (622.8 gal.) was more than triple the amount of the present formulation (186.6 gal.), as seen in Eqs. (5) and (6) below respectively.

$$(1.73 \text{ gal}/1000 \text{ gal}) \times (1000 \text{ gal/min}) \times (60 \text{ min/hr}) \times 6 \text{ hr} = 622.8 \text{ gallons} \quad (5)$$

$$(3.11 \text{ gal}/1000 \text{ gal}) \times (1000 \text{ gal/min}) \times (60 \text{ min/hr}) \times 1 \text{ hr} = 186.6 \text{ gallons} \quad (6)$$

Cleaner Comparative Example 5 and Example 6, CaCO3 Dissolution

The comparative effectiveness of the commercial sulfuric acid/urea adduct type of cleaner sold under the N-pHURIC® brand name and of the formulation of the present invention in dissolving a calcium carbonate deposit under a substantially static water-flow condition was determined under a simulated "sea shell" test, as follows. Since sea shells are composed primarily of calcium carbonate together with a small amount of organic material, and in that respect, they simulate calcium carbonate deposits formed inside a micro-irrigation system, small particles of sea shells were used to establish the effectiveness of the respective cleaners in dissolving calcium carbonate deposits under substantially static water-flow conditions. In each test, an approximately 0.05-gram particle of a sea shell was placed into a 100 ml Erlenmeyer flask containing 100 ml of a 10% by volume aqueous solution of the respective cleaning product (N-pHURIC® or the present formulation). The sea shell particles were then weighed at time intervals and recorded respectively in Tables 3 and 4 below.

The formation of carbon dioxide within the first few seconds, and then its almost immediate cessation, was observed in the flask in which a sea shell particle was immersed in diluted N-pHURIC®, and there was no further evolution of carbon dioxide thereafter. This phenomenon is consistent with the passivation of the calcium carbonate particle by a film of calcium sulfate, and the ensuing inhibition of calcium carbonate dissolution, in the presence of a sulfuric acid/urea adduct under the substantially static conditions discussed above. In addition, the passivation of the sea shell particle and inhibition of dissolution is also demonstrated by the small weight loss in the first minute (less than 2 wt. percent) followed by negligible weight loss (less than 8 wt. percent total) over the next six hours. (See the data of Table 3 above.) The calcium carbonate (sea shell) particle appears unaffected and just remains in the bottom of the flask.

TABLE 3

Cleaner Comparative Example 5
Sea Shell Particle Dissolution in 10% N-pHURIC ®

| Elapsed Time (min.) | Sea Shell Particle Weight (grams) |
|---|---|
| 0 | 0.053 |
| 1 | 0.052 |
| 2 | 0.051 |
| 5 | 0.050 |
| 60 | 0.049 |
| 120 | 0.050 |
| 240 | 0.049 |
| 480 | 0.048 |
| 720 | 0.048 |

TABLE 4

Cleaner Example 6
Sea Shell Particle Dissolution in 10% Present Formulation

| Elapsed Time (min.) | Sea Shell Particle Weight (grams) |
|---|---|
| 0 | 0.065 |
| 1 | 0.049 |
| 2 | 0.038 |
| 5 | 0.019 |
| 10 | 0.011 |
| 15 | Present but too small to isolate |
| 20 | Totally dissolved |

In contrast, the sea shell particle immersed in the diluted present formulation was observed to begin to liberate carbon dioxide immediately, and to continue to evolve carbon dioxide until the time at which the particle was totally dissolved. As indicated by the data of Table 4 above, the sea shell particle was completely dissolved within 20 minutes, and any other materials liberated during the dissolution process were not detectable and thus presumably dispersed in solution by the phosphonate in the formulation. This is all consistent with the formation of the very soluble calcium formate upon the mechanism of formic acid dissolution of calcium carbonate discussed above, plus the keeping of any other material in fine suspension via the dispersant activity of the phosphonate in the formulation.

Another advantage of the present formulation is its low corrosivity. As mentioned above, micro-irrigation systems are typically constructed from plastic and metal, such as mild steel, components. Strong mineral acids such as sulfuric, hydrochloric, nitric and phosphoric acids are corrosive and if not handled very carefully when used in or about micro-irrigation systems these acids can damage the metal and plastic components. Although the commercial N-pHURIC® product is an adduct of urea and sulfuric acid, rather than a mixture, it is still very corrosive when compared to the formic-acid based formulation of the present invention, as demonstrated in Cleaner Comparative Examples 7 and 8, and Cleaner Examples 9 and 10 below.

Cleaner Comparative Examples 7 and 8, and Examples 9 and 10, Corrosion

Mild steel corrosion coupons (standard test coupons for determining the corrosivity of a given environment) were each separately suspended in equal volumes of the following: (a) the commercial N-pHURIC® product neat (Cleaner Comparative Example 7); (b) a 5 percent aqueous solution of the commercial N-pHURIC® product (Cleaner Comparative Example 8); (c) the about 40 percent actives formulation of the present invention neat (Cleaner Example 9); and (d) a 5 percent aqueous solution of the formulation of the present invention (Cleaner Example 10). The weights of coupons with elapsed time were determined and recorded, and the percent coupon loss was calculated therefrom. The data for each (comparative) example is set forth in Tables 5 to 8 below.

TABLE 5

Cleaner Comparative Example 7
N-pHURIC ® (neat, as is)

| Elapsed Time | Coupon Weight | Wt. Percent Coupon Loss |
|---|---|---|
| 0 hrs. | 1.15 g | 0.0% |
| 3 hrs. | 1.13 g | 1.7% |
| 6 hrs. | 1.12 g | 2.6% |
| 24 hrs. | 1.09 g | 5.2% |
| 48 hrs. | 1.03 g | 10.4% |
| 72 hrs. | 1.01 g | 12.2% |
| 144 hrs. | 0.99 g | 13.9% |

TABLE 6

Cleaner Comparative Example 8
5 percent N-pHURIC ® in water

| Elapsed Time | Coupon Weight | Wt. Percent Coupon Loss |
|---|---|---|
| 0 hrs. | 1.16 g | 0.0% |
| 3 hrs. | 1.13 g | 2.6% |
| 6 hrs. | 1.11 g | 4.3% |
| 24 hrs. | 0.95 g | 18.1% |
| 48 hrs. | 0.53 g | 54.3% |
| 72 hrs. | 0.22 g | 81.0% |
| 144 hrs. | 0.00 g | 100.0% |

TABLE 7

Cleaner Example 9
Present Formulation (neat, as is)

| Elapsed Time | Coupon Weight | Wt. Percent Coupon Loss |
|---|---|---|
| 0 hrs. | 1.16 g | 0.0% |
| 3 hrs. | 1.15 g | 0.9% |
| 6 hrs. | 1.13 g | 2.6% |
| 24 hrs. | 1.12 g | 3.4% |
| 48 hrs. | 1.12 g | 3.4% |
| 72 hrs. | 1.11 g | 4.3% |
| 144 hrs. | 1.11 g | 4.3% |

TABLE 8

Cleaner Example 10
5% Present Formulation in water

| Elapsed Time | Coupon Weight | Wt. Percent Coupon Loss |
|---|---|---|
| 0 hrs. | 1.15 g | 0.0% |
| 3 hrs. | 1.14 g | 0.9% |
| 6 hrs. | 1.14 g | 0.9% |
| 24 hrs. | 1.12 g | 2.6% |
| 48 hrs. | 1.10 g | 4.3% |
| 72 hrs. | 1.08 g | 6.1% |
| 144 hrs. | 1.03 g | 10.4% |

As indicated in the data of Tables 5-8 above, a sulfuric acid/urea adduct cleaner, such as the commercial N-pHURIC® product, is significantly more corrosive than the formic acid-based formulation of the present invention. Further, the corrosivity of the commercial N-pHURIC® product, as measured by wt. percent coupon loss, is greater in dilute aqueous solution than the neat product at all time intervals tested, and leads to total consumption of the test coupon at or prior to the end of the 144-hour test.

Distribution Uniformity Test

The distribution uniformity evaluation is a test developed by California Polytechnic University to quantify the distribution, or lack thereof, of water to the crop that is being irrigated. Distribution uniformity, or "DU," is the measurement of the uniformity of the distribution or delivery of water throughout the entire block that is being irrigated. DU is a ratio comparison of the "lower quarter" delivery of water to the overall average delivery of water within the block being evaluated. The numeric DU of a block is the average water-delivery volume per unit time of the 25 percent poorest-performing (in terms of water delivery) emitters divided by the average water-delivery volume per unit time of all of the emitters, or DU=A¼LA100, wherein "A¼L" is the average of the lowest ¼ collected-water values and "A100" is the average of all of the collected-water values. In practice, a statistically-significant proportion of the emitters on the micro-irrigation system are tested, and the water emitted from each while under normal irrigation-system water flow is collected during a given time interval, for instance 5 minutes, measured and the DU is determined from the averages after the lowest 25 percent are identified. This test was devised for use in irrigation management particularly to avoid under-irrigation by compensating for non-uniformity with application of extra irrigation water. To measure this ratio, a statistically-significant number of drip emitters are tested and the amount of water collected for each emitter is determined per unit time. The average ("average") delivery rate for all emitters collected is determined. Then the average delivery rate is determined for the lowest 25% of the emitters ("lower ¼").

A high DU means that the emitters in the micro-irrigation system are operating properly and there is little or no fouling or plugging of the micro-irrigation system. Typical DUs for a newly installed micro-irrigation system are usually in the 85 to 90 percent range. DUs conducted before and after a cleaner is used normally provide a good evaluation of the cleaner's effectiveness.

Cleaner Example 11, Distribution Uniformity Evaluation

To determine the efficacy of the present formulation in cleaning a micro-irrigation system, a DU evaluation was conducted on a 45-acre vineyard that was known to have areas in which there was poor distribution of water to some of the grape vines. This particular ranch was irrigated in two sections or blocks of approximately 20.5 acres and 24.5 acres. This division of the acreage into two irrigation blocks is necessitated by limits on the volume that can be pumped into the field and delivered to the crop, which in turn depends on the size of the pump as well as the elevation of the crops being irrigated. The 20.5-acre block was chosen for this study because the grower reported that this block appeared to have the most plugged emitters. A statistically significant number of emitters were selected and assigned identification numbers of 1 through 100. The time interval of water collection from each emitter was five minutes for each stage of the evaluation. First, a "before treatment" DU test was conducted, and the water collected from each of the 100 emitters was measured and recorded. Then the block underwent a shock treatment using the formulation of the present invention as described above. After completion of the shock treatment, including the final step of flushing the system with water, an "after treatment" DU test was conducted, and the water collected from each of the same 100 emitters was measured and recorded. This data, plus the calculated before and after totals and averages (A100), are set forth in Table 9 below.

TABLE 9

Cleaner Example 11
Distribution Uniformity ("DU") Evaluation, All Emitters Tested

| Emitter No. | Volume of Water Collected (ml) in five minutes | |
| --- | --- | --- |
| | Before Treatment | After Treatment |
| 1 | 133 | 156 |
| 2 | 142 | 161 |
| 3 | 8 | 124 |
| 4 | 150 | 171 |
| 5 | 89 | 163 |
| 6 | 121 | 163 |
| 7 | 137 | 159 |
| 8 | 121 | 165 |
| 9 | 71 | 142 |
| 10 | 0 | 5 |
| 11 | 151 | 157 |
| 12 | 142 | 178 |
| 13 | 21 | 150 |
| 14 | 101 | 161 |
| 15 | 0 | 72 |
| 16 | 132 | 153 |
| 17 | 142 | 172 |
| 18 | 151 | 169 |
| 19 | 130 | 167 |
| 20 | 111 | 171 |
| 21 | 89 | 159 |
| 22 | 121 | 159 |
| 23 | 141 | 169 |
| 24 | 160 | 167 |
| 25 | 147 | 151 |
| 26 | 0 | 0 |
| 27 | 119 | 162 |
| 28 | 76 | 170 |
| 29 | 42 | 142 |
| 30 | 149 | 171 |
| 31 | 111 | 166 |
| 32 | 150 | 161 |
| 33 | 141 | 149 |
| 34 | 156 | 171 |
| 35 | 80 | 154 |
| 36 | 67 | 161 |
| 37 | 121 | 150 |
| 38 | 141 | 159 |
| 39 | 118 | 171 |
| 40 | 138 | 168 |
| 41 | 69 | 142 |
| 42 | 21 | 157 |
| 43 | 145 | 161 |
| 44 | 139 | 146 |
| 45 | 150 | 165 |
| 46 | 155 | 178 |
| 47 | 134 | 172 |
| 48 | 123 | 169 |
| 49 | 152 | 178 |
| 50 | 90 | 145 |
| 51 | 129 | 161 |
| 52 | 141 | 163 |
| 53 | 72 | 159 |
| 54 | 6 | 145 |
| 55 | 150 | 171 |
| 56 | 142 | 162 |
| 57 | 136 | 158 |
| 58 | 101 | 142 |

TABLE 9-continued

Cleaner Example 11
Distribution Uniformity ("DU") Evaluation. All Emitters Tested Volume of Water Collected (ml) in five minutes

| Emitter No. | Before Treatment | After Treatment |
|---|---|---|
| 59 | 149 | 167 |
| 60 | 160 | 165 |
| 61 | 155 | 162 |
| 62 | 144 | 159 |
| 63 | 147 | 178 |
| 64 | 160 | 166 |
| 65 | 89 | 149 |
| 66 | 123 | 159 |
| 67 | 23 | 99 |
| 68 | 139 | 149 |
| 69 | 142 | 161 |
| 70 | 159 | 162 |
| 71 | 148 | 160 |
| 72 | 78 | 154 |
| 73 | 5 | 7 |
| 74 | 129 | 160 |
| 75 | 158 | 182 |
| 76 | 149 | 167 |
| 77 | 161 | 166 |
| 78 | 159 | 162 |
| 79 | 149 | 172 |
| 80 | 154 | 171 |
| 81 | 172 | 169 |
| 82 | 147 | 162 |
| 83 | 155 | 169 |
| 84 | 158 | 173 |
| 85 | 131 | 162 |
| 86 | 151 | 166 |
| 87 | 139 | 149 |
| 88 | 16 | 145 |
| 89 | 145 | 162 |
| 90 | 97 | 157 |
| 91 | 154 | 169 |
| 92 | 33 | 145 |
| 93 | 101 | 159 |
| 94 | 158 | 165 |
| 95 | 158 | 149 |
| 96 | 171 | 167 |
| 97 | 160 | 162 |
| 98 | 129 | 155 |
| 99 | 152 | 159 |
| 100 | 102 | 154 |
| Total | 11,884 | 15,468 |
| Average | 118.9 | 154.7 |

Then the lowest 25% of the emitters ("lower 114") of the "before treatment" DU test were identified and their collected-water data plus the calculated before totals and averages (A¼) are set forth in Table 10 below.

TABLE 10

Cleaner Example 11
Lower ¼ - Before Treatment

Volume of Water Collected (ml) in five minutes

| Emitter No. | Before Treatment | After Treatment |
|---|---|---|
| 3 | 8 | 124 |
| 5 | 89 | 163 |
| 9 | 71 | 142 |
| 10 | 0 | 5 |
| 13 | 21 | 150 |
| 14 | 101 | 161 |
| 15 | 0 | 72 |
| 21 | 89 | 159 |
| 26 | 0 | 0 |
| 28 | 76 | 170 |
| 29 | 42 | 142 |

TABLE 10-continued

Cleaner Example 11
Lower ¼ - Before Treatment

Volume of Water Collected (ml) in five minutes

| Emitter No. | Before Treatment | After Treatment |
|---|---|---|
| 35 | 80 | 154 |
| 36 | 67 | 161 |
| 41 | 69 | 142 |
| 42 | 21 | 157 |
| 50 | 90 | 145 |
| 53 | 72 | 159 |
| 54 | 6 | 145 |
| 65 | 89 | 149 |
| 67 | 23 | 99 |
| 72 | 78 | 154 |
| 73 | 5 | 7 |
| 88 | 16 | 145 |
| 90 | 97 | 157 |
| 92 | 33 | 145 |
| Total | 1,243 | |
| Average | 49.72 | |

Although the "after treatment" volumes for this set of emitters is listed in Table 10, as that data normally is listed in a DU evaluation, it is not taken into consideration because the "after treatment" lowest 25 percent of emitters are identified from the "after treatment" delivery performances and therefore that set of emitters is not exactly the same. The lowest 25% of the emitters ("lower ¼") of the "after treatment" DU test were identified and their collected-water data plus the calculated before totals and averages (A¼) are set forth in Table 11 below.

TABLE 11

Cleaner Example 11
Lower ¼ - After Treatment

Volume of Water Collected (ml) in five minutes

| Emitter No. | Before Treatment | After Treatment |
|---|---|---|
| 3 | 8 | 124 |
| 9 | 71 | 142 |
| 10 | 0 | 5 |
| 13 | 21 | 150 |
| 15 | 0 | 72 |
| 25 | 147 | 151 |
| 26 | 0 | 0 |
| 29 | 42 | 142 |
| 33 | 141 | 149 |
| 35 | 80 | 154 |
| 37 | 121 | 150 |
| 41 | 69 | 142 |
| 44 | 139 | 146 |
| 50 | 90 | 145 |
| 54 | 6 | 145 |
| 58 | 101 | 142 |
| 65 | 89 | 149 |
| 67 | 23 | 99 |
| 68 | 139 | 149 |
| 72 | 78 | 154 |
| 73 | 5 | 7 |
| 87 | 139 | 149 |
| 88 | 16 | 145 |
| 92 | 33 | 145 |
| 95 | 158 | 149 |
| Total | | 3,105 |
| Average | | 124.2 |

From the calculated averages listed on Tables 27-29, the "before treatment" and "after treatment" DU values were determined as set forth in Eqs. (7) and (8) below.

Before Treatment: DU=49.72/118.9×100=41.8%  (7)

After Treatment: DU=124.2/154.7×100=80.3%  (8)

The "before" and "after" treatment DU values of Cleaner Example 11 in comparison indicate the vast improvement in irrigation-water distribution uniformity that can be achieved with a shock treatment using the formulation of the present invention. This improved distribution uniformity translates into a significant water conservation and cost savings. For example, assuming the crop being irrigated requires 1.5 acre-feet of water (488,777 gallons)/acre, the amount of additional water required to avoid under-irrigation before and after treatment is set forth below in Eqs. 9 and 10.

Before Treatment: (1.5 acre-feet/acre)/0.418=3.59 acre-feet/acre  (9)

After Treatment: (1.5 acre-feet/acre)/0.803=1.87 acre-feet/acre  (10)

This 1.72 acre-feet/acre saving of water represents a huge cost savings for the water, the energy required for pumping that water, and the fertilizer that is injected into the irrigation water.

Cleaner Comparative Example 12 and Example 13, CaCO₃ Dissolution

The Japanese patent publication Yamaguchi et al. (JP 2004-217919), which is referred to herein as "Yamaguchi et al.," discloses the use of a combination of a persulfate and citric (or malic) acid to clean a micro-irrigation system through which a dissolved manure is delivered as fertilizer (referred to therein as a liquid fertilizer) in a hydroponic system. Such manure or like biological material would exist as residuals in the Yamaguchi et al. system.

To provide a definitive comparison between the method of the present invention and the method disclosed in Yamaguchi et al., the formulation used in the Yamaguchi et al. method was used in a sea shell, the test parameters of which are described above in Comparative Example 5 and Example 6. Any differences between the test procedure described in Comparative Example 5 and Example 6 and that used Comparative Example 12 and Example 13 are set forth below.

Because a slight amount of manure was added to the test solutions to activate the persulfate as provided in Yamaguchi et al., it was also added in sea shell test performed on a formulation of the present invention, both as a comparative and as a control to establish that the presence of manure did not impact the sea-shell test's significance or consequence.

In each of the tests of these Comparative Example 12 and Example 13, referred to herein as CE-12 and E-13, two sea shell fragments each weighing approximately 0.2 gram were placed into separate 100 ml Erlenmeyer flasks (CE-12 and E-13) each containing 100 ml of an aqueous solution. The CE-12 solution contained a formulation of Yamaguchi et al. at a 4 wt. percent actives concentration of each of its components (acid and persulfate) plus a trace amount of manure. The E-13 solution contained a formulation of the present invention at a 4 wt. percent actives concentration (acid) plus a trace amount of manure.

The Yamaguchi et al. actives in the CE-12 solution were sodium persulfate (4 grams as actives) and citric acid (4 grams as actives) to provide a 50/50 actives weight ratio. The present invention's actives in the E-13 solution were formic acid (4 grams as actives). To assure that the trace of manure present in each was at the same concentration, it was added to each flask as 25 ml of a very dilute aqueous manure solution.

The weights of the respective sea shell fragments versus the elapse of time are set forth below in Table 12.

TABLE 12

| Time (min) | E-13 Sea shell wt. (g.) | CE-12 Sea shell wt. (g.) |
| --- | --- | --- |
| 0 | 0.193 | 0.199 |
| 1 | 0.187 | 0.200 |
| 2 | 0.180 | 0.201 |
| 5 | 0.155 | 0.198 |
| 10 | 0.132 | 0.196 |
| 15 | 0.115 | 0.195 |
| 20 | 0.105 | 0.194 |
| 30 | 0.098 | 0.193 |
| 60 | 0.071 | 0.190 |
| 90 | 0.059 | 0.191 |
| 120 | 0.031 | 0.190 |
| 180 | 0.010 | 0.188 |
| 240 | too small to weigh | 0.187 |
| 270 | gone | 0.186 |
| 480 |  | 0.183 |
| 720 |  | 0.178 |
| 1440 |  | 0.164 |
| 2880 |  | 0.152 |
| 4320 |  | 0.141 |
| 5760 |  | 0.133 |
| 7200 |  | 0.120 |
| 10080 |  | 0.095 |
| 14400 |  | 0.066 |

The conversion from elapsed time in minutes to elapsed time in days in Table 12 above is as follows: 1,440 min. is one day; 2,880 min. is two days; 4,320 minutes is three days; 5,760 minutes is four days; 7,200 minutes is five days; 10,080 minutes is seven days; and 14,400 minutes is ten days.

The data set forth on Table 12 establishes the vast performance difference between the method of the present invention and the method disclosed in Yamaguchi et al.

The weight of the fragment in solution E-13 declines rapidly (a greater than 49 wt. % dissolution in 30 min.) and continually as it approaches complete dissolution. The weight of the fragment in Solution CE-12 declines barely (a merely 3 wt. % dissolution in 30 min.) and haltingly, with no dissolution at all detected between elapsed times of 60 minutes and 120 minutes (when at a mere 4.5 wt. % dissolution stage).

The data set forth on Table 12 further shows for E-13 a greater than 60 wt. % dissolution in 1 hour and continually as it reaches almost 95 wt. % dissolution in 3 hours. See Table 12. Complete dissolution is reached by 270 min. or 4.5 hr. The weight of the fragment in Solution CE-12 provides less than 5 wt. % dissolution in 1 hour and then haltingly, with almost no dissolution at all detected between elapsed times of 1 hour and 3 hours, when it changes from merely 4.5 wt. % dissolution to merely 5.5 wt. % dissolution.

Still further, as shown in Table 12 for CE-12, not only is the rate of dissolution during the first day extremely sluggish, providing only a total fragment-sample weight loss of less than 18 wt. % the entire day, the rate of dissolution actually decreases after the first day. Quantifying this decreasing dissolution rate using the data of Table 12, it is seen that the rate of dissolution per day drops from the initial 18 wt. percent to 7.3 wt. percent during the second day, 7.2 wt. percent during the third day, 5.7 wt. percent during the fourth day, and 9.8 wt. percent during the fifth day. Moreover, the total fragment weight loss is merely 35 percent after five days, and only 66 percent after ten days.

In summary of the data set forth in Table 12 above, the method of the present invention rapidly dissolves the sea shell fragment and continues to dissolve the sea shell fragment until it is completely dissolved. Complete dissolution was achieved within four and a half hours. The method of Yamaguchi et al., when used as required for the present method, does not approach complete dissolution in one day, or even five days, and the half-way dissolution point is barely reached in ten days.

In micro-irrigation systems, and as meant and understood herein, calcium carbonate deposits are seldom pure calcium carbonate and include a minor amount of other foulants such as magnesium carbonate for example. By calcium carbonate deposits is meant and understood herein to be deposits that substantially comprise calcium carbonate and are at least 90 wt. percent calcium carbonate.

In preferred embodiments of the invention, after feeding the cleaning solution to a micro-irrigation system, the flow of irrigation water is stopped and allowed to stand for up to twenty-four hours to dissolve the deposits, after which the irrigation-system block is flushed. The method of the present invention, in other words, interrupts irrigation to an entire block in a micro-irrigation system for up to twenty-four hours. For growers, that is an enormous time period that would be intolerable if not for the fact that such downside is balanced by the benefits going forward of a well cleaned micro-irrigation system. Prolonging that system interruption even farther, for instance to two or three days, would be intolerable even if great results were achieved, which they are not with the Yamaguchi et al. method. Further, the data of Table 12 indicates that the results using the Yamaguchi et al. method remain unacceptable even after five and ten days.

In a preferred embodiment of particular efficacy, practicality and economy, the present invention is a method using a micro-irrigation system cleaning formulation wherein the aqueous cleaning-formulation solution contains from about 20 to about 60 parts by weight of the water-soluble organic acid per 100 parts by weight of the aqueous cleaning-formulation solution, wherein the water-soluble organic acid is substantially formic acid, and wherein the aqueous cleaning-formulation solution further contains a sufficient amount of a water-soluble phosphonate dispersant selected from the group consisting of 1-hydroxy ethylidene diphosphonic acid (HEDP) and amino-tris(methylene phosphonic acid) (ATMP).

In another preferred embodiment of particular efficacy, practicality and economy, the present invention is a method using a micro-irrigation system cleaning formulation wherein the aqueous cleaning-formulation solution contains from about 20 to about 60 parts by weight of the water-soluble organic acid per 100 parts by weight of the aqueous cleaning-formulation solution, wherein the water-soluble organic acid is predominantly formic acid, and wherein the aqueous cleaning-formulation solution further contains a sufficient amount of a water-soluble phosphonate dispersant selected from the group consisting of 1-hydroxy ethylidene diphosphonic acid (HEDP) and amino-tris(methylene phosphonic acid) (ATMP).

In another preferred embodiment of particular efficacy, practicality and economy, the present invention is a method using a micro-irrigation system cleaning formulation wherein the aqueous cleaning-formulation solution contains from about 10 to about 80 parts by weight of the water-soluble organic acid per 100 parts by weight of the aqueous cleaning-formulation solution, wherein the water-soluble organic acid is predominantly formic acid, and wherein the aqueous cleaning-formulation solution further contains from about 0.001 to about 5 parts by weight of a water-soluble phosphonate dispersant per 100 parts by weight of the aqueous solution.

The method of the present invention also generates a cleansing irrigation water comprising, in combination, a natural source water and an effective amount of a water-soluble organic acid, wherein the water soluble organic acid has a pK(1)a (in other words, either a pKa or a pK1a) of less than about 4.0. In preferred embodiments, the cleansing irrigation water contains from about 0.01 to about 1.0 parts by weight of the water-soluble organic acid per 100 parts by weight of the irrigation water. In certain preferred embodiments, the cleansing irrigation water contains a sufficient amount of the water-soluble organic acid to provide a pH of from about 2.5 to about 3.0.

In a preferred embodiment of particular efficacy, practicality and economy, the water-soluble organic acid is substantially formic acid and the cleansing irrigation water further contains a sufficient amount of a water-soluble phosphonate dispersant selected from the group consisting of 1-hydroxy ethylidene diphosphonic acid (HEDP) and amino-tris(methylene phosphonic acid) (ATMP). In another preferred embodiment of particular efficacy, practicality and economy, the water-soluble organic acid is predominantly formic acid and the cleansing irrigation water further contains a sufficient amount of a water-soluble phosphonate dispersant selected from the group consisting of I-hydroxy ethylidene diphosphonic acid (HEDP) and amino-tris(methylene phosphonic acid) (ATMP).

In a further preferred embodiment of particular efficacy, practicality and economy, the water-soluble organic acid is predominantly formic acid and the cleansing irrigation water further contains from about 0.005 to about 20 parts by weight of a water-soluble phosphonate dispersant per 100 parts by weight of the water-soluble organic acid.

The present invention provides a method of cleaning a micro-irrigation system, comprising the steps of: (1) introducing a sufficient amount of a cleaning formulation containing a sufficient concentration of a water-soluble organic acid having a pK(1)a of less than about 4.0 to irrigation water; and (2) feeding the irrigation water to the micro-irrigation system. The method of cleaning a micro-irrigation system preferably includes the steps of: introducing a sufficient amount of the cleaning formulation to the irrigation water to lower the pH of the irrigation water to about 2.5 to about 3.5; feeding the acidified irrigation water to the micro-irrigation system for a sufficient time period to distribute the acidified irrigation water substantially throughout a block of the micro-irrigation system; then stopping the flow of the irrigation water; then allowing the acidified irrigation water to stand in the block of the micro-irrigation system for a sufficient amount of time; and then flushing the block of the micro-irrigation system.

In other preferred embodiments, the method of cleaning a micro-irrigation system further includes the steps of: introducing a sufficient amount of the cleaning formulation to the irrigation water to lower the pH of the irrigation water to about 2.5 to about 3.5; feeding the acidified irrigation water to the micro-irrigation system for a sufficient time period to distribute the acidified irrigation water substantially throughout a block of the micro-irrigation system; then stopping the flow of the irrigation water; then allowing the acidified irrigation water to stand in the block of the microirrigation system for a time period of from about 3 to about 24 hours; and then flushing the block of the micro-irrigation system.

In further preferred embodiments, the method of cleaning a micro-irrigation system includes the steps of: introducing a sufficient amount of the cleaning formulation to the irrigation water to lower the pH of the irrigation water to about 2.5 to about 3.5; feeding the acidified irrigation water to the micro-irrigation system for a time period of from about 40 to about 60 minutes to distribute the acidified irrigation water substantially throughout a block of the micro-irrigation system; then stopping the flow of the irrigation water; then allowing the acidified irrigation water to stand in the block of the micro-irrigation system for a time period of from about 3 to about 24 hours to dissolve deposits in the micro-irrigation system; and then flushing the block of the micro-irrigation system.

In still further preferred embodiments, the cleaning formulation further contains a sufficient amount of a water-soluble phosphonate dispersant and the method of cleaning a micro-irrigation system includes the steps of: introducing a sufficient amount of the cleaning formulation to the irrigation water to lower the pH of the irrigation water to about 2.5 to about 3.5; feeding the acidified irrigation water to the micro-irrigation system for a time period of from about 40 to about 60 minutes to distribute the acidified irrigation water substantially throughout a block of the micro-irrigation system; then stopping the flow of the irrigation water; then allowing the acidified irrigation water to stand in the block of the micro-irrigation system for a time period of from about 3 to about 24 hours to dissolve deposits and suspend particles in the micro-irrigation system; and then flushing the block of the micro-irrigation system.

In preferred embodiments generally, the micro-irrigation system cleaned is one fouled by calcium carbonate deposits and the method of the present invention completely dissolves the calcium carbonate deposits.

While the foregoing written description of the invention enables one of ordinary skill in the art to make and use the invention, and to make and use what is presently considered the best mode of the invention, those of ordinary skill in the art will understand and appreciate the existence of variations, combinations and equivalents of the specific embodiments, methods and examples provided herein. The present invention should not be limited by the above described embodiments, methods and examples.

What is claimed is:

1. A method of cleaning a block of an irrigation system or protect the block of the irrigation system against corrosion, comprising:

introducing a cleaning formulation comprising water, a water-soluble organic acid having an anion that forms a water-soluble calcium salt, and a water-soluble phosphonate dispersant to irrigation water to form a dispersant-containing irrigation water, wherein introducing said cleaning formulation lowers a pH of said dispersant-containing irrigation water to 2.5 to 3.5, and said water-soluble phosphonate dispersant is present in an amount of from 0.0005 to 16 parts by weight per 100 parts by weight of the cleaning formulation;

distributing said dispersant-containing irrigation water throughout said block of said irrigation system;

allowing said dispersant-containing irrigation water to stand in said block of said irrigation system for a time period of from 3 to 24 hours; and then flushing said block of said irrigation system.

2. The method of claim 1, wherein said water-soluble phosphonate dispersant is a water-soluble orthophosphonate dispersant.

3. The method of claim 1, wherein said water-soluble phosphonate dispersant is selected from the group consisting of 1-hydroxy ethylidene diphosphonic acid (HEDP), amino-tris(methylene phosphonic acid) (ATMP), and sodium, potassium and ammonium salts thereof.

4. The method of claim 1, wherein said water-soluble organic acid has a pK(1)a of less than 4.0.

5. The method of claim 1, wherein said water-soluble organic acid is formic acid.

6. The method of claim 1, wherein distributing said dispersant-containing irrigation water throughout said block of said irrigation system comprises feeding the dispersant-containing irrigation water to the irrigation system to distribute the dispersant-containing irrigation water throughout the block of the irrigation system.

7. The method of claim 6, wherein the dispersant-containing irrigation water is fed to the micro-irrigation system for a time period of from 40 to 60 minutes.

8. The method of claim 6, wherein the irrigation system is a micro-irrigation system, and the dispersant-containing irrigation water is fed to the micro-irrigation system for a time period of from 40 to 60 minutes.

9. The method of claim 1, wherein said cleaning formulation contains 0.005 to 20 parts by weight of said water-soluble phosphonate dispersant per 100 parts by weight of the water-soluble organic acid.

10. The method of claim 1, wherein the cleaning formulation is introduced at a rate or level of from 1 to 10 kg of actives per acre served by the irrigation system.

11. The method of claim 1, wherein the cleaning formulation contains from 10 to 80 parts by weight of the water-soluble organic acid per 100 parts by weight of the cleaning formulation.

12. The method of claim 11, wherein the cleaning formulation contains from 20 to 60 parts by weight of the water-soluble organic acid per 100 parts by weight of the cleaning formulation.

13. The method of claim 1, wherein the dispersant-containing irrigation water contains from 0.01 to 1.0 parts by weight of the water-soluble organic acid per 100 parts by weight of the dispersant-containing irrigation water.

14. The method of claim 1, wherein the irrigation system includes (i) irrigation tubing that is above ground and (ii) emitters or micro-sprinklers.

15. The method of claim 1, wherein the water-soluble calcium salt has a solubility in water of at least 2,000 ppm.

16. The method of claim 15, wherein the solubility in water of the water-soluble calcium salt is over 5,000 ppm.

17. The method of claim 1, wherein allowing said dispersant-containing irrigation water to stand in said block of said irrigation system removes or solubilizes deposits, keeps solids dispersed, or suspends particles in said block of said irrigation system.

* * * * *